No. 746,081. PATENTED DEC. 8, 1903.
A. H. HILL.
CHEESE CUTTER.
APPLICATION FILED JUNE 30, 1903.
NO MODEL. 2 SHEETS—SHEET 1.
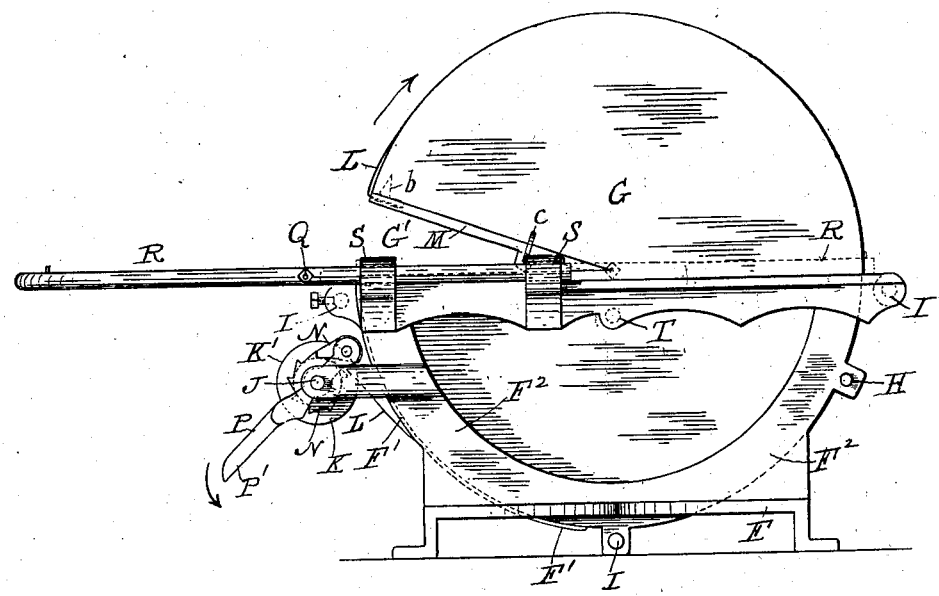
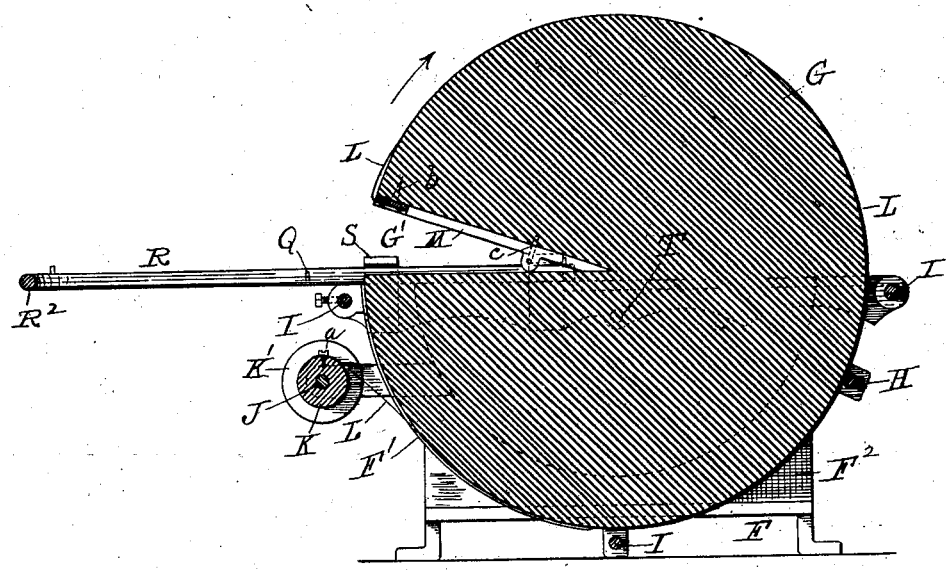

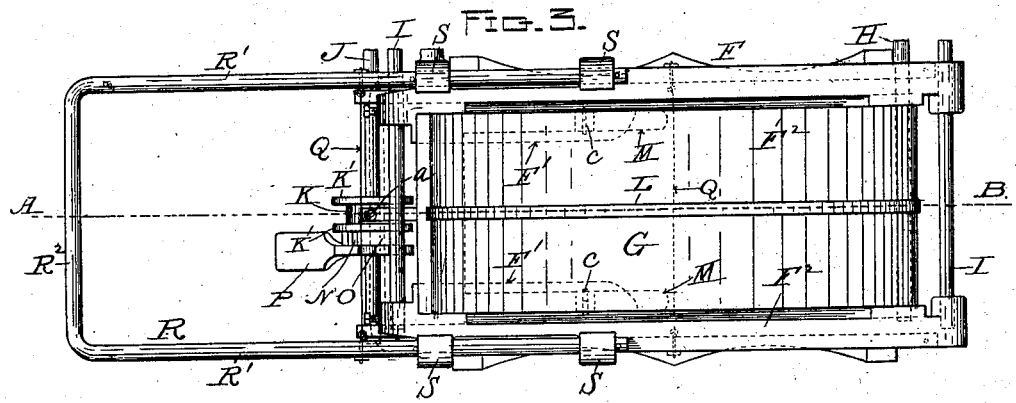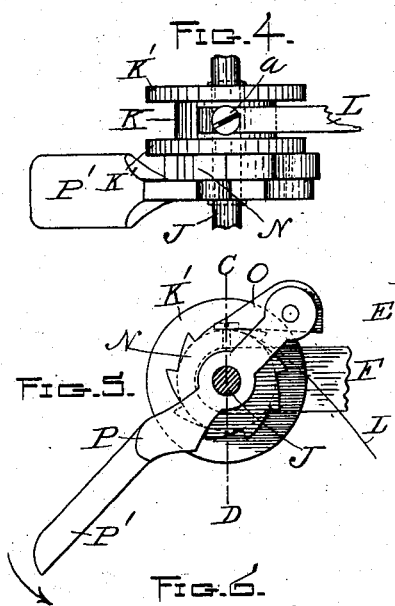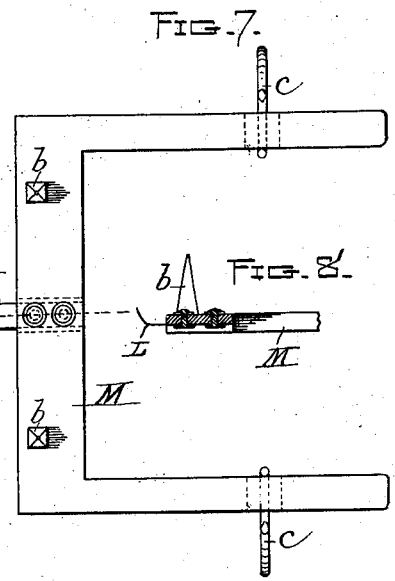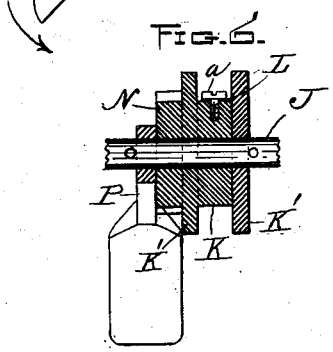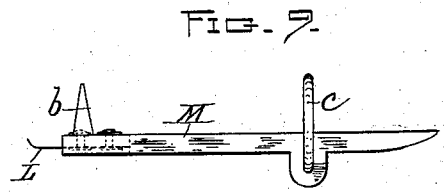

No. 746,081.                                                    Patented December 8, 1903.

UNITED STATES PATENT OFFICE.

ALFRED H. HILL, OF STERLING, MASSACHUSETTS, ASSIGNOR OF ONE-HALF TO HARRISON W. RUGG, OF STERLING, MASSACHUSETTS.

CHEESE-CUTTER.

SPECIFICATION forming part of Letters Patent No. 746,081, dated December 8, 1903.

Application filed June 30, 1903. Serial No. 163,693. (No model.)

*To all whom it may concern:*

Be it known that I, ALFRED H. HILL, a citizen of the United States, residing at Sterling, in the county of Worcester and State of Massachusetts, have invented certain new and useful Improvements in Cheese-Cutters, of which the following is a full, clear, and exact description, reference being had to the accompanying drawings, forming a part of this specification, in which similar letters of reference indicate corresponding parts in all the figures.

Figure 1 represents a side view of my said improved cheese-cutter. Fig. 2 is a central vertical longitudinal section thereof, taken on line A B, Fig. 1. Fig. 3 is a top or plan view of the cheese-cutter. Fig. 4 represents, upon an enlarged scale, a plan view of the mechanism for turning the cheese after each triangular-shaped section is cut therefrom preparatory to cutting the next section, as will be hereinafter described. Fig. 5 is a front side view of the parts shown in Fig. 4. Fig. 6 is a vertical transverse section therethrough, taken on line C D, Fig. 5. Fig. 7 is an under side plan view of a frame which is adapted to be attached to the cheese and connected by a metal band to the cheese-turning mechanism, above referred to. Fig. 8 is a section on line E, Fig. 7; and Fig. 9 is a side view of the frame shown in Fig. 7.

My invention consists, in brief, of a segment-shaped frame adapted to rest on a table or other support and made of the proper shape to receive and hold the cheese. It also consists of mechanism connected with said holding-frame and which may be detachably secured to the cheese for turning said cheese part of a revolution at a time intermittently and for cutting triangular-shaped sections therefrom after each partial revolution, as will be hereinafter more fully set forth.

In order that others may better understand the nature and purpose of my said invention, I will now proceed to describe it more in detail.

In the drawings, F represents the aforesaid segment-shaped frame in which the cheese G is placed, said cheese when placed therein resting on the transverse rod H and on the segment-shaped internally-projecting flanges F' F', formed upon or secured to the side pieces F² F² of said frame F. Said side pieces are held together by the transverse rods I I I, rod H, above referred to, and rod or shaft J, upon which the cheese-turning mechanism is mounted. Said mechanism is constructed and operated to turn the cheese as follows: Upon the rod or shaft J is mounted a loose hub K, to which is secured, by means of set-screw *a*, one end of a metal band L, the opposite end of said band being secured to the center of frame M, which is attached to cheese G, as previously stated.

Upon hub K is formed or secured ratchet-wheel N, with the teeth of which pawl O is adapted to engage to turn said hub K when lever P is operated. Said lever is pivoted on rod or shaft J and to the outer end of pawl O, as is best shown in Fig. 5. Therefore when the handle P' is forced down in the direction shown by the arrow in said Fig. 5 the pawl is forced forward against the notches and the hub K turned as aforesaid, thereby drawing lengthwise upon the metal band L, secured thereto, the distance that said hub is turned.

In preparing the cheese to be cut a V-shaped section G' is first cut therefrom by the use of a knife in the ordinary way. The frame M is then fitted against one side of said cut surface, the spurs *b b* on said frame being driven into the cheese to secure said frame in position. Hooks *c c* in each side arm of said frame are also driven into the sides of the cheese for the same purpose, as is shown in Figs. 1 and 2. The cheese is now placed in the frame F, as previously described, with the frame secured at the upper side of the cut and the band L extended around said cheese to the hub K, as is best shown in Fig. 2. It is now ready for cutting the V-shaped sections therefrom by means of my mechanical device, the cheese of course being first placed so that the solid uncut portion where the next cut is to be made comes at the proper place for the cutter Q of the device to act thereon. Said cutter in this instance consists of a wire strung taut across from one arm R' to the other of a horizontal frame R, fitted to slide longitudinally in guide-bearings S at the top of each side frame F² F². Said slide-frame R is operated forward and back longitudinally by grasping the transverse end R², which serves as a handle to thus operate it. The cheese having been turned the proper distance, as previously described, in the direction shown by the arrows and the slide-frame R drawn out its full length, it is obvious that by now forcing the same in toward the cheese the wire-cutter thereof coming in contact with said cheese enters and cuts through the same, thereby severing a V-shaped section therefrom, the width of which is governed by the distance that the cheese has been turned around. In practice said distance may be gaged so that a piece of cheese of a certain weight—say one-half pound, one pound, or any desired weight—may be cut from the cheese at each operation of turning and cutting each section therefrom.

My invention is designed principally for use in retail stores, its object being to save time and trouble, and therefore expense, in serving customers and also to provide a means for cutting the cheese evenly and in a neat manner without liability to injury to the hands of the salesman, as is liable to occur when cutting a cheese with a knife by hand. If desired, a fixed steel blade may be substituted for the cutting-wire Q for cutting cheese with tough rinds that a wire cutter would not pass through. As the cheese is cut away and the band L is drawn forward it is wound upon the hub K between the two flanges K' K', and when said cheese has been one-half cut away, so that the plate M comes below the horizontal level of the center thereof, a rod T (see dotted lines, Figs. 1 and 2) is passed transversely over the cut surface of the cheese to hold it properly in place, the ends of said holding-rod being held in suitable openings in the side frames F² F².

Having now described my invention, what I claim therein as new, and desire to secure by Letters Patent, is—

1. A cheese-cutter comprising in combination, a frame consisting of two segment-shaped side pieces, united by suitable transverse holding-rods at the proper distance apart to receive the cheese between them, a rod and flanges for supporting said cheese in said frame, a hub mounted loose on a transverse rod or shaft in turn supported at the ends in the main frame; a ratchet-wheel formed upon or secured to said hub, a lever also fitted loose on the rod or shaft that the hub is mounted on, at one side of said hub, a pawl pivoted at one end to the upper end of said lever and adapted to engage at the opposite end with the teeth of the ratchet-wheel, a metal band connected with the aforesaid hub, extending around the cheese and connected at its opposite ends with a frame adapted to fit against the upper side of the cut-away portion of the cheese, said frame, means for attaching it to the cheese, a horizontal frame fitted to slide longitudinally in suitable bearings in the main frame and a cutter mounted transversely in said slide-frame, substantially as, and for the purpose set forth.

2. In a cheese-cutter, the combination of the main frame consisting of two side pieces arranged at the proper distance apart to receive the cheese between them and connected by means of suitable transverse connecting-rods, with a hub mounted on a transverse rod or shaft, in turn mounted in the main frame, said rod or shaft, a lever pivoted thereon at the side of the aforesaid hub, a ratchet-wheel formed upon or secured to said hub, a pawl pivoted at one end to said lever, and adapted to engage with the teeth on said ratchet-wheel at its other end, a band connecting said hub with a frame adapted to fit against the upper side of the cut-away portion of the cheese, means for attaching said frame to the cheese, substantially as and for the purpose set forth.

ALFRED H. HILL. [L. S.]

Witnesses:
KATE L. TAFT,
H. W. RUGG.